United States Patent
Wakeley et al.

(10) Patent No.: US 7,532,605 B2
(45) Date of Patent: May 12, 2009

(54) MAC-PHY INTERFACING FOR WIRELESS DEVICES

(75) Inventors: Timothy P. Wakeley, Antelope, CA (US); William C. Crosswy, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1098 days.

(21) Appl. No.: 10/337,467

(22) Filed: Jan. 7, 2003

(65) Prior Publication Data
US 2004/0131035 A1 Jul. 8, 2004

(51) Int. Cl.
*H04Q 7/24* (2006.01)

(52) U.S. Cl. .................. 370/338; 370/463; 370/347; 370/458; 370/419; 370/469

(58) Field of Classification Search .............. 370/462, 370/463, 347; 455/127.1; 320/338, 468
See application file for complete search history.

(56) References Cited

U.S. PATENT DOCUMENTS

| | | | |
|---|---|---|---|
| 5,636,140 A | 6/1997 | Lee et al. | |
| 6,154,464 A | 11/2000 | Feuerstraeter et al. | |
| 6,222,852 B1 | 4/2001 | Gandy | |
| 6,269,104 B1 | 7/2001 | McLaughlin et al. | |
| 6,335,938 B1 * | 1/2002 | Chiang et al. | 370/458 |
| 6,385,208 B1 | 5/2002 | Findlater et al. | |
| 6,510,150 B1 * | 1/2003 | Ngo | 370/347 |
| 6,516,952 B1 * | 2/2003 | Wang et al. | 209/227 |
| 6,661,999 B1 * | 12/2003 | Johnson et al. | 455/127.1 |
| 7,020,729 B2 * | 3/2006 | Taborek et al. | 710/305 |
| 2003/0099253 A1 * | 5/2003 | Kim | 370/462 |
| 2003/0191854 A1 * | 10/2003 | Hsu et al. | 709/233 |
| 2004/0028074 A1 * | 2/2004 | Huff et al. | 370/463 |
| 2004/0071249 A1 * | 4/2004 | Schell | 375/371 |

OTHER PUBLICATIONS

Bhatt, Ajay, V., "Creating a Third Generation I/O Interconnect" www.intel.com/technology/3GIO/downloads/3rdGenWhitePaper.pdf (2002).
JEDEC JC-61 Committee, "Technical Background White Paper" JEDEC JC-61: Oct. 2002.

* cited by examiner

*Primary Examiner*—David Q Nguyen

(57) ABSTRACT

Methods, devices and systems for a wireless device interface are provided. A media access controller (MAC) is provided on a printed circuit board (PCB). A physical layer device (PHY) is interfaced to the MAC using one or more high speed serial input/output channels.

39 Claims, 17 Drawing Sheets

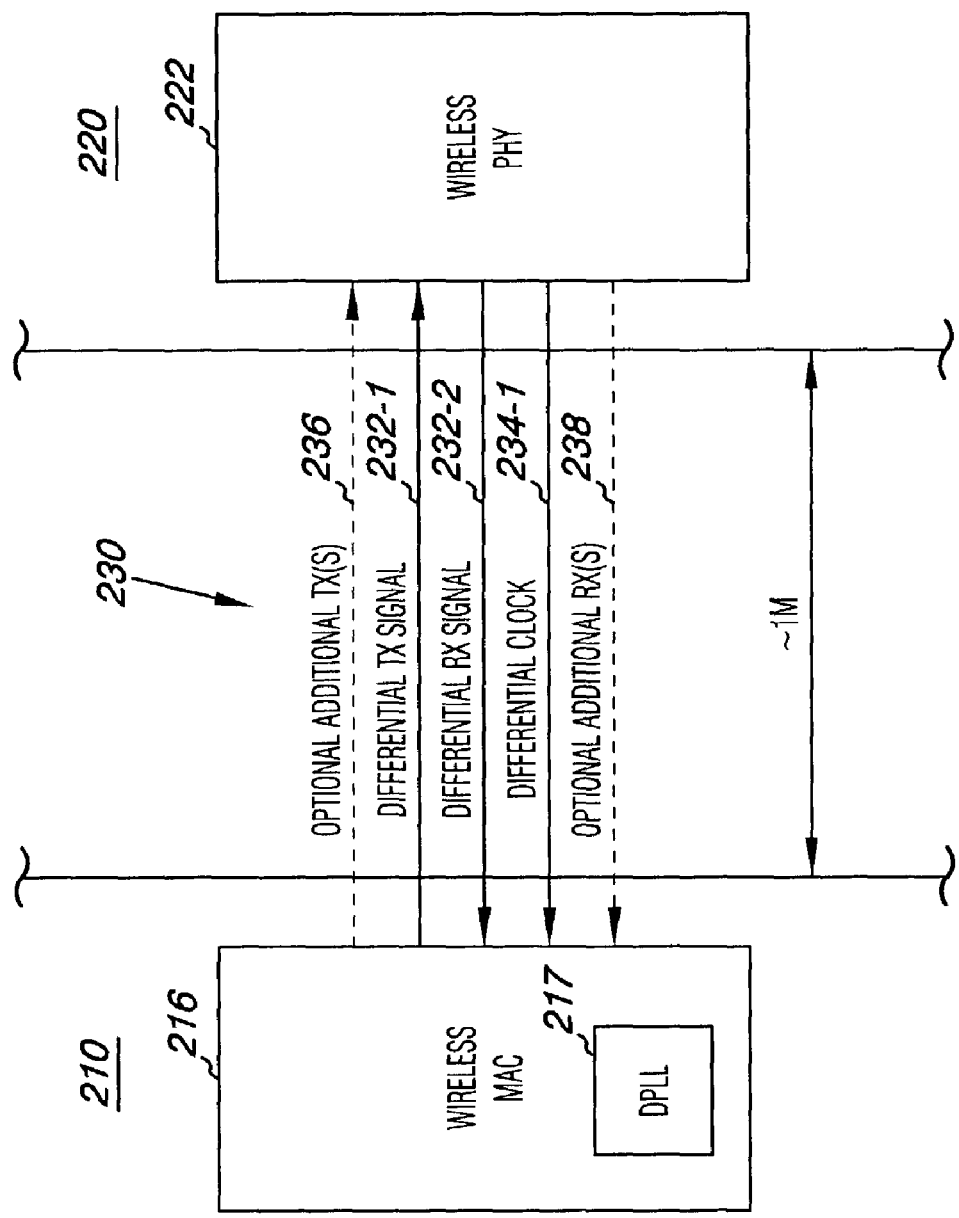

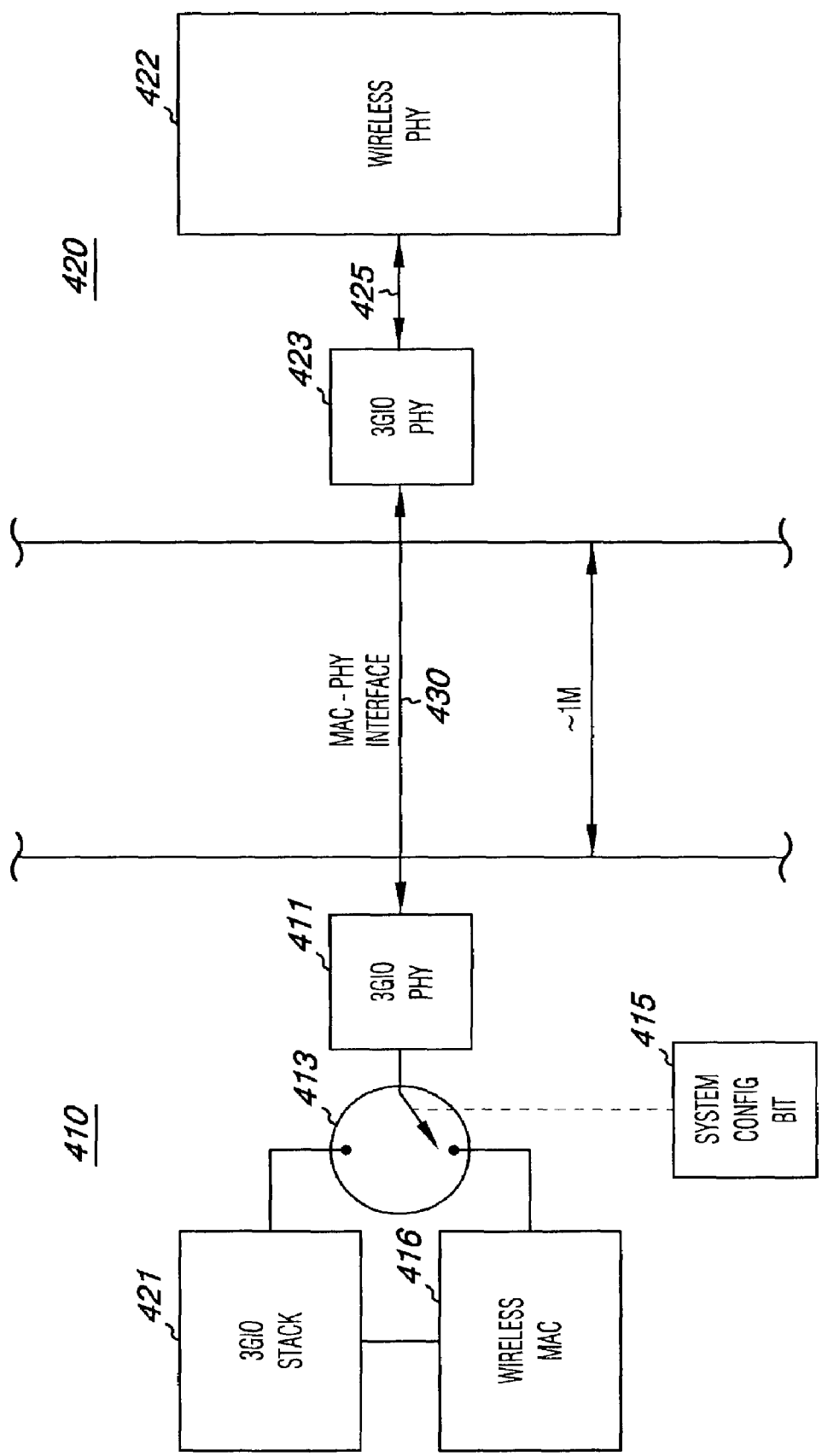

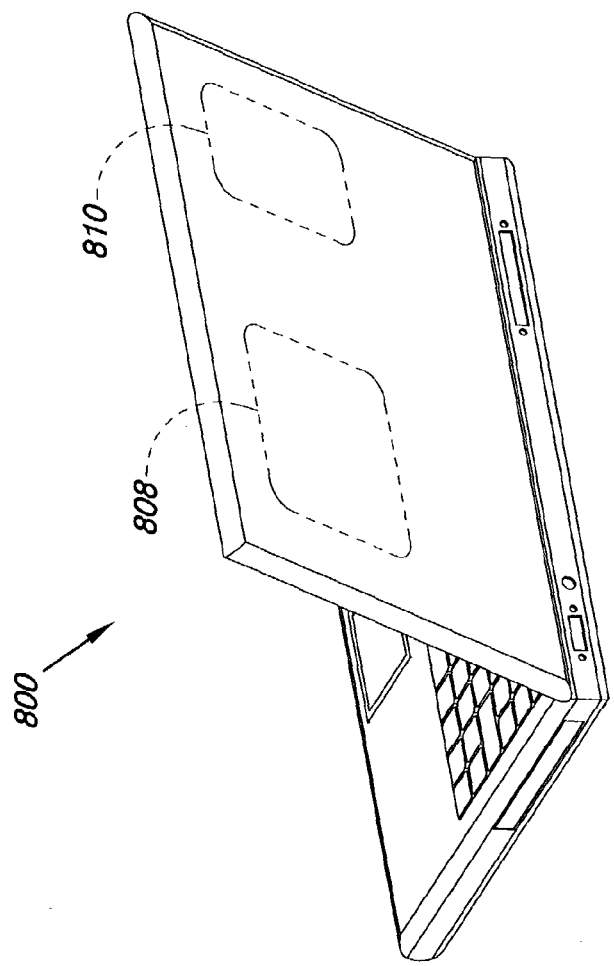
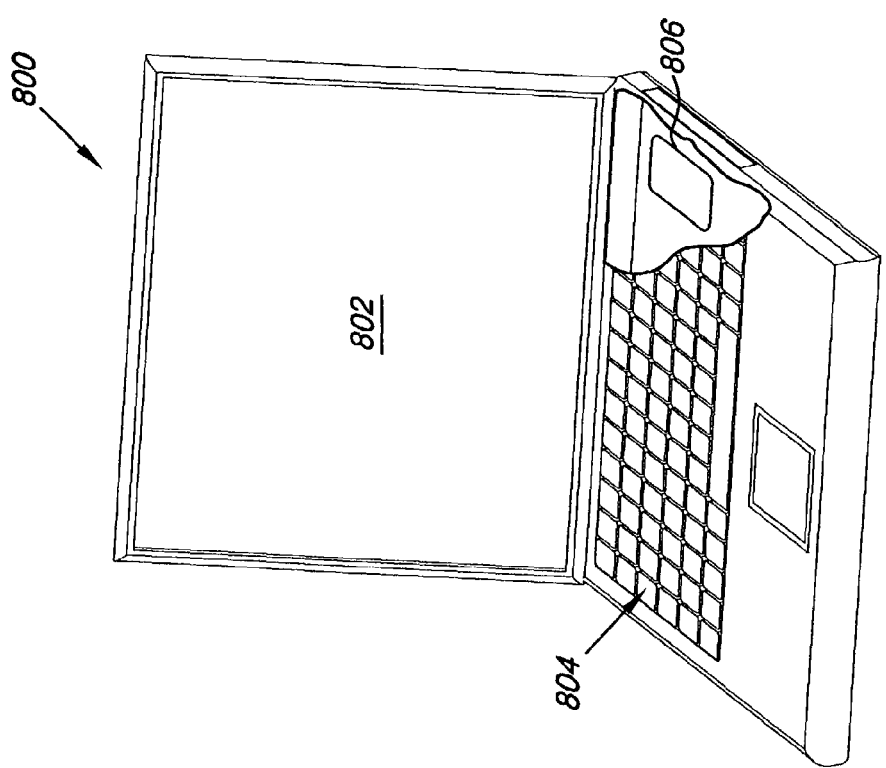
Fig. 8B
Fig. 8A

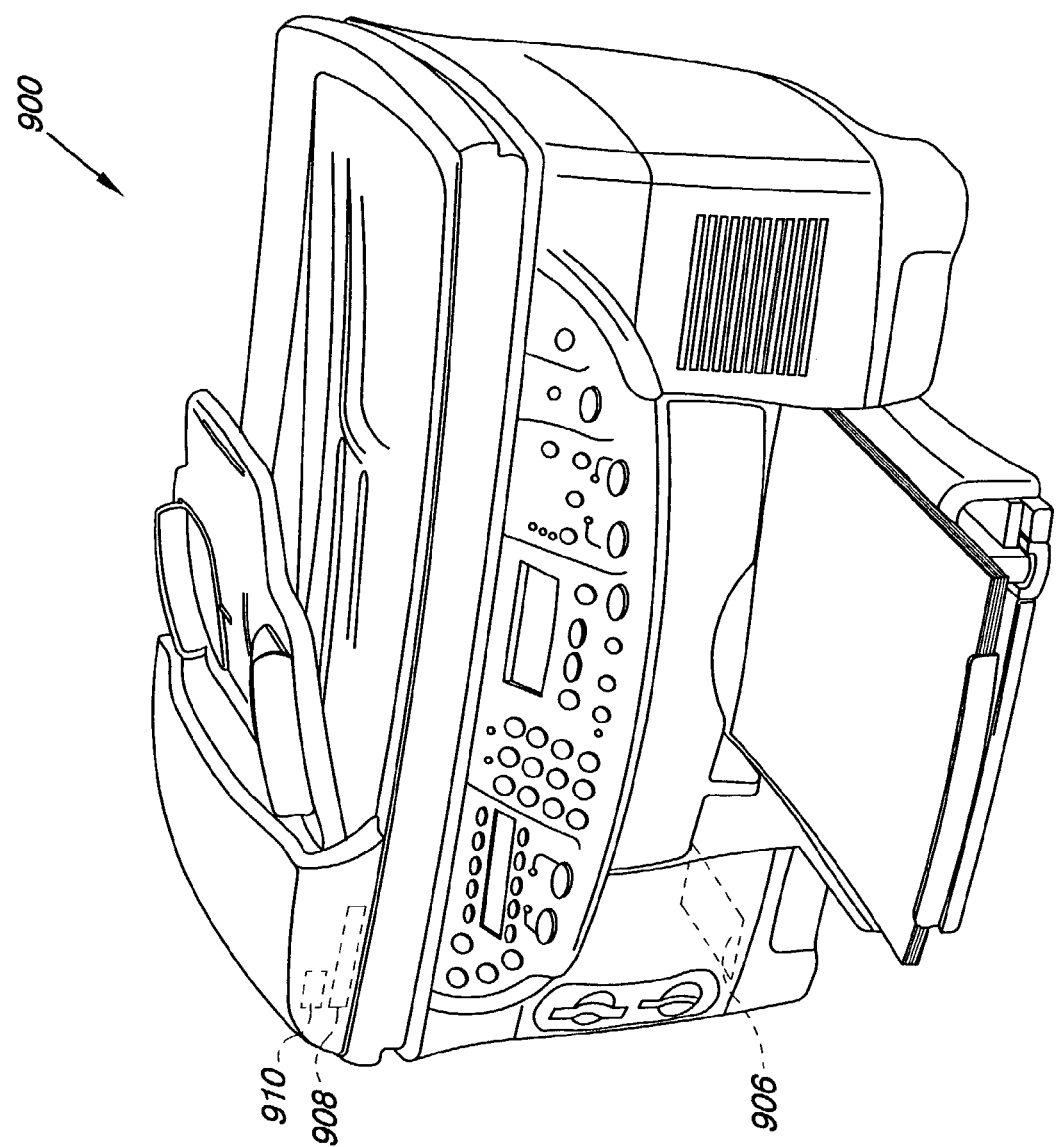

MAC-PHY INTERFACING FOR WIRELESS DEVICES

INTRODUCTION

Most networks are organized as a series of layers, each one built upon its predecessor. The purpose of each layer is to offer services to the higher layers, shielding those layers from implementation details. Between each pair of adjacent layers there is an interface that defines those services.

The International Standards Organization has developed a layered network architecture called the Open Systems Interconnection (OSI) Reference model that has seven protocol layers: application, presentation, session, transport, network, data link, and physical.

The function of the lowest level, the physical layer, is to transfer bits over a communication medium. The function of the data link layer is to partition input data into data frames and transmit the frames over the physical layer sequentially. Each data frame includes a header that contains control and sequence information for the frames.

The interface between the data link layer and the physical layer includes a medium access control (MAC) device and physical layer signaling control (PHY) device. The purpose of a MAC device and the PHY device is to ensure two network stations are communicating with the correct frame format and protocol.

In wireless local area networks (WLANs), a radio is the physical device, and free space is the physical communications medium. IEEE 802.11 is a standard for WLANs that defines the communication protocol between a MAC device and a radio, the PHY device. WLAN data communication protocol requires that each data frame transferred between the MAC and the PHY devices have a PHY header, a MAC header, MAC data, and error checking fields. The PHY header includes a preamble that is used to indicate the presence of a signal, unique words, frame length, etc. The MAC header includes frame control, duration, source and destination address, data sequence number, etc.

Although standard 802.11 defines the logical PHY/MAC interface, 802.11 does not define the physical interface between a MAC device and a PHY device. For example, assuming that the standard provides that a byte of information is to be passed from the MAC device to the PHY, the standard does not provide how the byte is be transferred. That is, the standard does not provide a physical definition as to whether the byte is passed as eight bits in parallel, or as one bit in serial using eight clock cycles. In addition to the 802.11 WLAN standard, many proprietary WLANs exist that define various different physical interfaces between the MAC device and the PHY device.

The wireless industry has been using many proprietary design and implementation practices. Currently, wireless connectivity is deployed in notebook PCs through the use of off-the-shelf PCMCIA cards and embedded Mini PCI cards. Unfortunately, this type of deployment often requires significant and costly efforts for the development of interface mechanics, card enclosures, multiple partnership, software drivers as well as joint pre-sales and post-sales design and support activities.

BRIEF DESCRIPTION OF DRAWINGS

FIG. 2A illustrates differential signal lines in an embodiment of a MAC-PHY interface.

FIG. 4B illustrates an embodiment for a MAC-PHY interface having a third generation input/output (3GIO) module located on both sides of the interface.

FIG. 8A illustrates a front perspective view of a laptop computer environment implementing one or more embodiments of the present invention.

FIG. 8B illustrates a rear perspective view of FIG. 8A.

FIG. 9 illustrates a perspective view of a printing device environment implementing one or more embodiments of the present invention.

DETAILED DESCRIPTION

The present invention relates to an improvement in the interface between the MAC layer and the physical layer in wireless networks. The following description is presented to enable one of ordinary skill in the art to make and use the invention and is provided in the context of a patent application and its requirements. Various modifications to the embodiments shown will be readily apparent to those skilled in the art and are intended to be within the scope of the present invention. Thus, the present invention is not intended to be limited to the embodiment shown, but is to be accorded the widest scope consistent with the principles and features described herein.

As wireless technologies proliferate, competitive pressures are fueling the need for cost reduction and integration. Wireless technology is now pervasive in wide area networks (WWAN), local area networks (WLAN), personal area networks (WPAN), and the like. This growth of wireless networking has allowed a new level of connectivity.

The present invention serves to integrate high-speed digital switching with high performance analog circuitries, e.g. ADCs and DACs, by addressing the interface between the data link MAC layer and the physical layer in the IEEE 802.11 layering architecture. A flexible architecture is afforded which can handle the need for both embedded baseband (BB) to radio frequency (RF) as well as MAC-PHY communications.

Figure 1A:
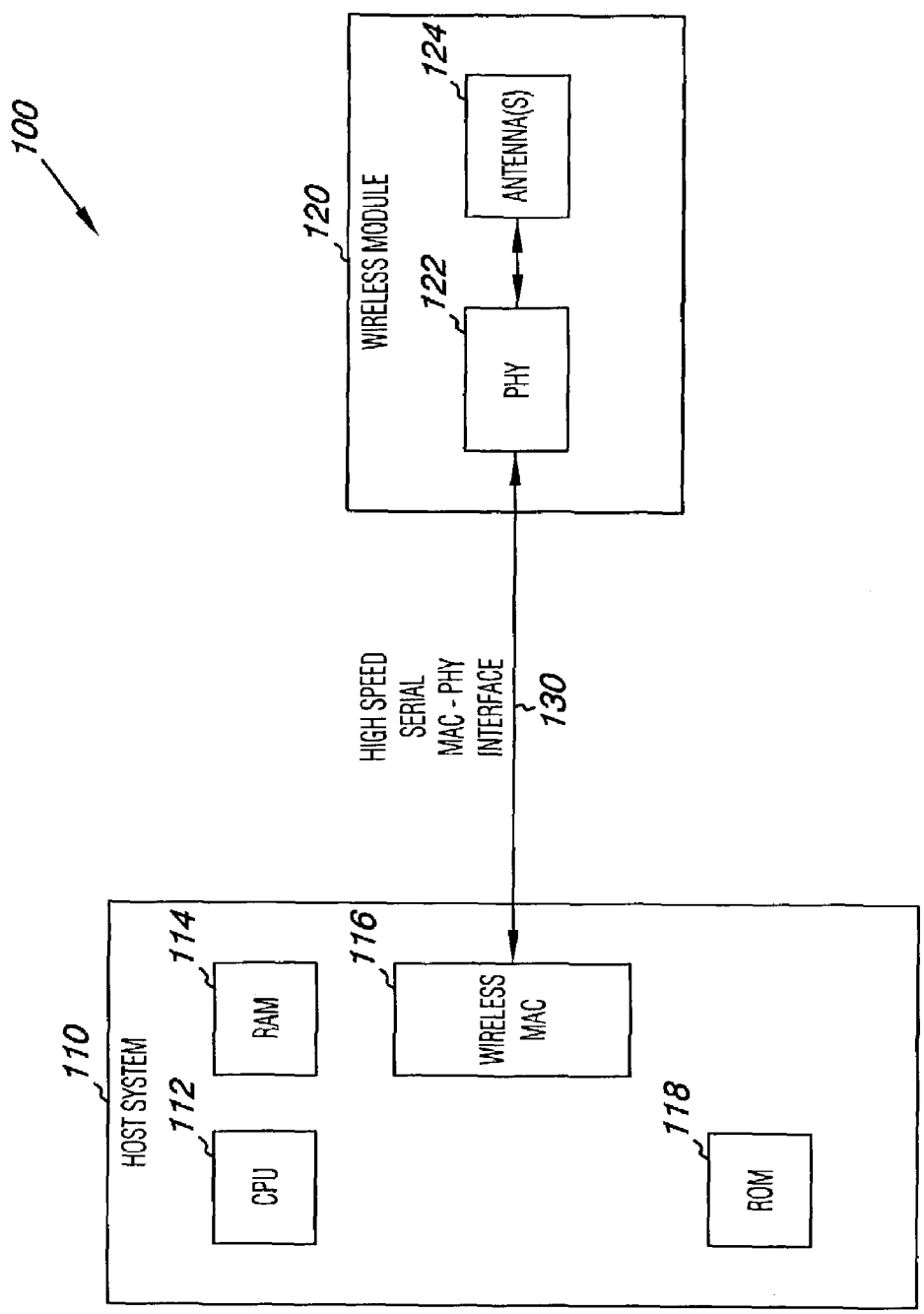
FIG. 1A illustrates an embodiment for a MAC-PHY interface.

FIG. 1A illustrates an embodiment for a MAC-PHY interface within a wireless device or wireless architecture 100. In FIG. 1A a host system 110 is shown linked to a wireless module 120 via a high speed serial interface 130. In the embodiment of FIG. 1A, the host system 110 includes one or more processing units, such as CPU 112, and memory (RAM 114 and ROM 118). Further, a wireless MAC layer 116 is shown in the host system 110. In various embodiments of the present invention the MAC 116 is a software defined MAC and can be integrated inside an application specific integrated circuit (ASIC) or chipset. The invention, however, is not so limited. In this manner, the same firmware or driver for the MAC 116 can be used from product to product. In various embodiments of the invention, the software defined MAC 116 allows, or facilitates connection to radio PHYs 122 included in networks such as wireless local area networks (WLANs), wireless personal area networks (WPANs), and wireless wide area networks (WWANs), among others.

In the embodiment of FIG. 1A, the wireless module 120 is illustrated containing a physical layer device (PHY) 122, such as a radio, as well as an antenna 124. In various embodiments of the invention, a set or defined protocol is used to interface the MAC 116 to the PHY 122 such that signaling between the MAC 116 and the PHY 122 does not have to depend on a particular PHY's communication standard. In this manner, the PHY 122 is vendor independent. That is, in the various embodiments of wireless architecture 100 neither the supplier nor the consumer is constrained by a solution or implementation dictated by the other side. Thus, the PHY 122 can be selected from the group of a WLAN PHY, a WWAN PHY, and a WPAN PHY, among others.

Figure 1B:
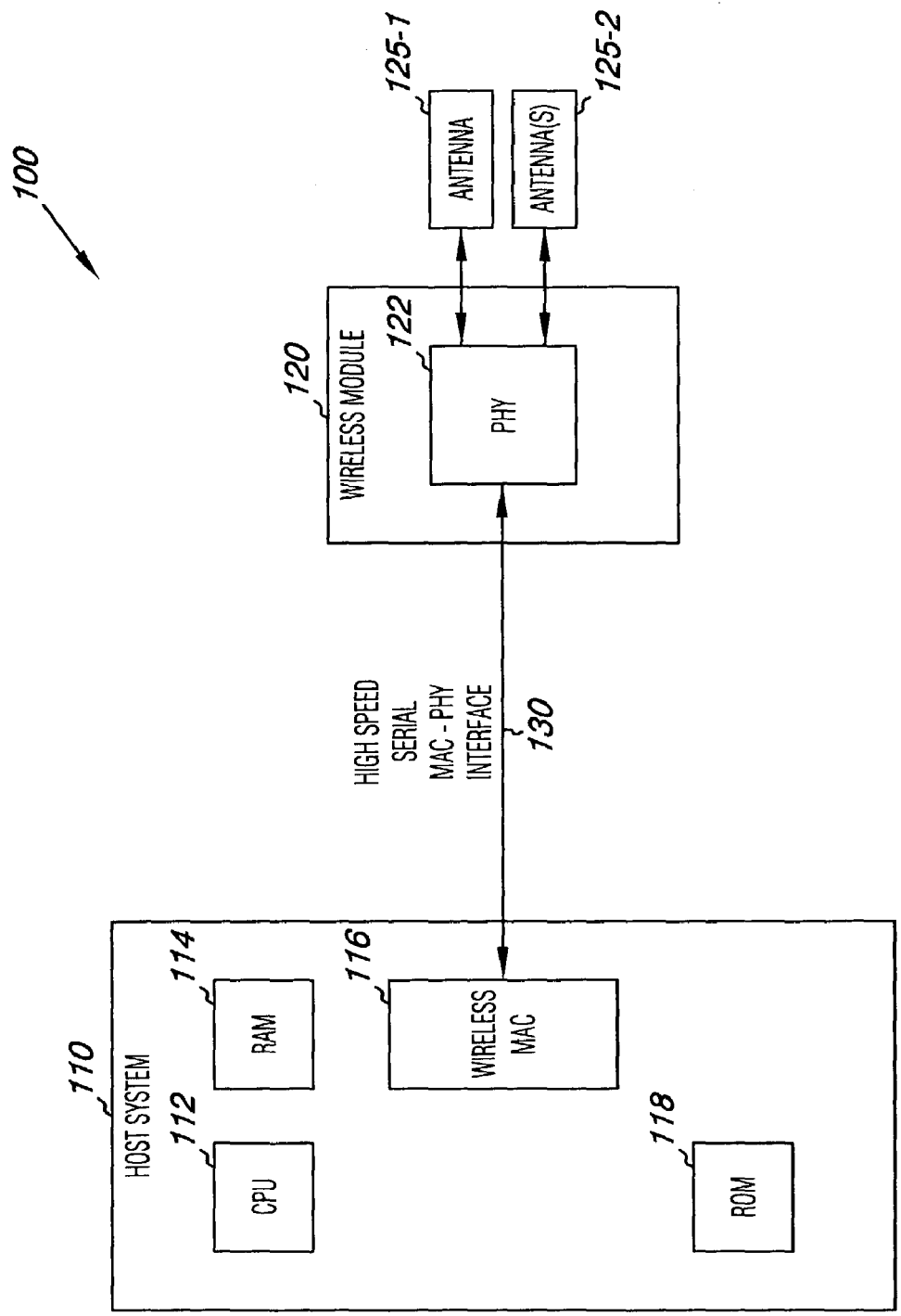
FIG. 1B illustrates another embodiment for a MAC-PHY interface in which antennas are located separate from a wireless module.

FIG. 1B illustrates another embodiment for a MAC-PHY interface in which antennas 125-1 and 125-2 are located apart from or separate from a wireless module 120.

In various embodiments, the high speed serial interface 130 includes a number of differential signal lines 130 to provide connectivity between the MAC 116 and the PHY 122. The high speed serial interface 130 can include third generation input/output (3GIO) lines 130. And, according to some embodiments of the invention, the high speed serial interface 130 can include one or more high speed serial input/output channels having a length of 1 meter or greater. As one of ordinary skill in the art will appreciate upon reading this disclosure, the embodiments of the present invention thus permit added flexibility for positioning the PHY 122 and antennas, 124/125-1, 125-2, in consideration of RF performance.

FIG. 2A illustrates differential signal lines 230 in an embodiment of a MAC-PHY interface, e.g. 216 and 222. The lines 230 can also serve as the high speed serial interface 130 shown in FIGS. 1A and 1B. The MAC 216 is illustrated in a host system 210, such as host system 110 shown in FIGS. 1A and 1B. The PHY 222 is illustrated in a wireless module 220, such as wireless module 120 shown in FIGS. 1A and 1B. In the embodiment of FIG. 2A, the MAC 216 is illustrated to include a digital phase locked loop component (DPLL) 217.

The differential signal lines 230 include any suitable differential signal line such as a twisted wire pair or coaxial signal line, among others. In the embodiment of FIG. 2A, the differential signal lines 230 include a pair of differential signal lines 232-1 and 232-2, which are used for signaling between the wireless MAC 216 and the wireless PHY 222. That is, in the embodiment of FIG. 2A, differential signal line 232-1 is illustrated for use in transmitting signals (TX) and differential signal line 232-2 is illustrated for use in receiving signals (RX). In the embodiment of FIG. 2A, the differential signal lines 230 include a differential signal line 234-1 for use in providing a differential clock signal from the wireless PHY 222. As will be understood by one of ordinary skill in the art upon reading this disclosure the DPLL 217 in the wireless MAC 216 can be used for resolving the differential clock signal from the wireless PHY 222.

Also, as shown in the embodiment of FIG. 2A, the differential signal lines 230 can include one or more optional, additional differential lines for use in transmitting signals 236 TX(S). And, the differential signal lines can include one or more optional, additional differential lines for use in receiving signals 238 RX(S).

As stated in connection with the previous Figures, the wireless MAC 216 in the various embodiments of the present invention includes a software defined wireless MAC 216. This feature lends itself to allowing the same firmware to be used as a wireless MAC 216 from product to product. Further, the various embodiments for the software defined MAC 216 accommodate connection to radio PHYs 222 from multiple communication standards. Thus, the software defined wireless MAC 216 can readily be included in various networks such as wireless local area networks (WLANs), wireless personal area networks (WPANs), and wireless wide area networks (WWANs), among others.

As stated in connection with the previous Figures, the various embodiments of the invention include a pre-established, standardized, set, or defined protocol for use in interfacing the wireless MAC 216 to the wireless PHY 222. In this manner, signaling between the wireless MAC 216 and the wireless PHY 222 does not have to depend on a particular wireless PHY's 222 communication standard and the wireless PHY 222 can be vendor independent.

The differential signal lines 230 provide a high speed serial interface 230 for connectivity between the wireless MAC 216 and the wireless PHY 222. In various embodiments, the high speed serial interface 230 can include third generation input/output (3GIO) lines 230. 3GIO lines are sometimes referred to as a PCI Express™ digital interface. In various embodiments, the high speed serial interface 230 can include a Universal Serial Bus (USB) interface, such as USB 2.0.

The embodiment of FIG. 2A illustrates that the differential signal lines can separate the wireless MAC 216 and the wireless PHY 222 by length of a meter or greater having the clock signal provided by the wireless PHY 222 and using a pre-established, standardized, set, or defined protocol for use in interfacing the wireless MAC 216 to the wireless PHY 222. As mentioned above, the various embodiments contained herein permit added flexibility for positioning the wireless PHY 222 in consideration of RF performance.

Figure 2B:
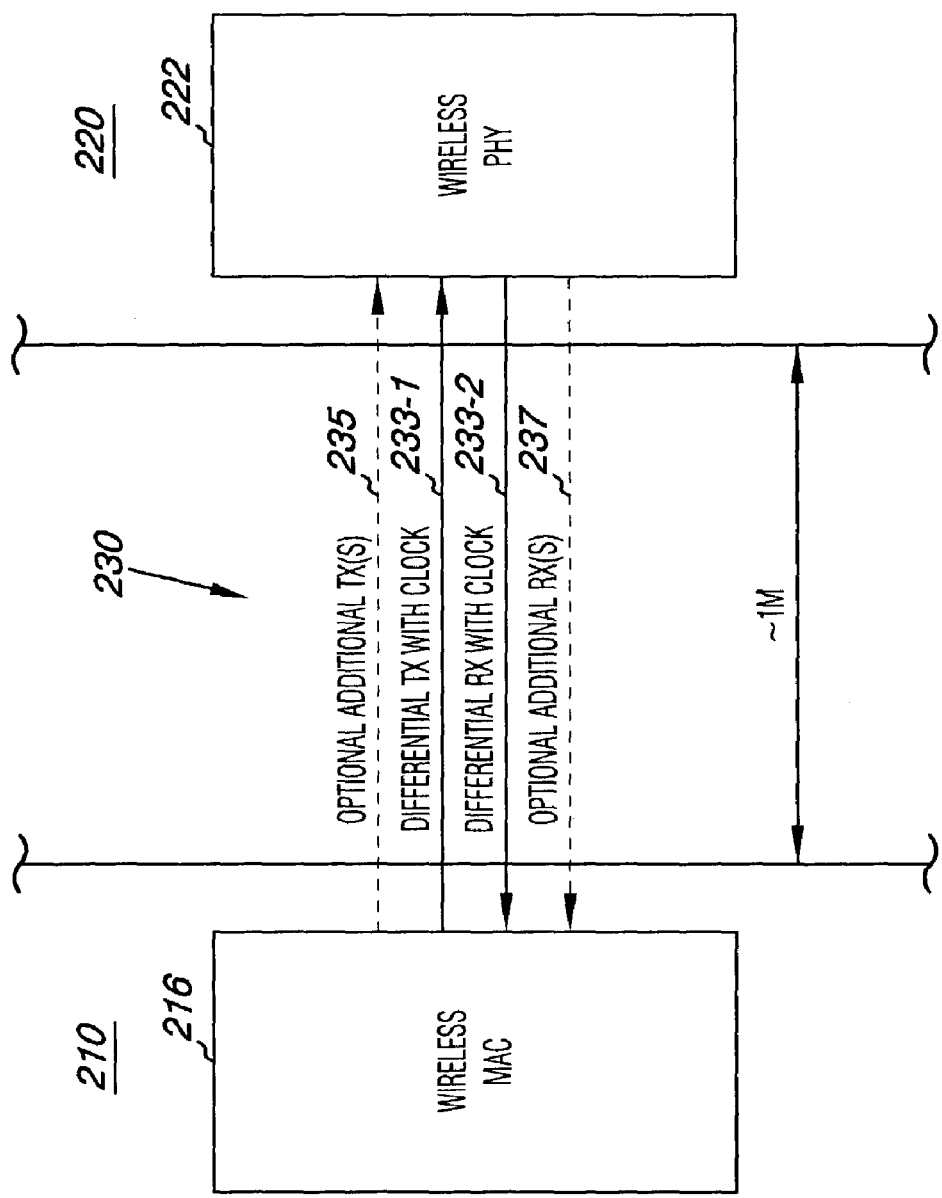
FIG. 2B illustrates differential signal lines having an embedded clock in an embodiment of a MAC-PHY interface.

FIG. 2B illustrates differential signal lines 230 having an embedded clock in an embodiment of a MAC-PHY interface. The differential signal lines 230 provide an interface between a wireless MAC 216, within a host system 210, and a wireless PHY 222 included in a wireless module 220.

In the embodiment of FIG. 2B the differential signal lines 230 include one or more high speed serial input/output lines, e.g. 233-1, 233-2, 235, and 237, which are used for signaling between the wireless MAC 216 and the wireless PHY 222. In the embodiment of FIG. 2B, the one or more high speed serial input/output lines include third generation input/output (3GIO) lines. As one of ordinary skill in the art will appreciate, 3GIO lines include twisted wire pairs and use an embedded clock in each data stream. In the embodiment of FIG. 2B, 3GIO line 233-1 is illustrated having an embedded clock and is illustrated for use in transmitting signals (TX). In the embodiment of FIG. 2B, 3GIO line 233-2 is also illustrated having an embedded clock and is illustrated for use in receiving signals (RX).

The embodiment of FIG. 2B illustrates optional, additional 3GIO lines can be provided for use in transmitting signals 235 TX(S) and for use in receiving signals 237 RX(S). However, the same are not required for the embodiment illustrated in FIG. 2B. As one of ordinary skill in the art will appreciate a 3GIO channel will include two twisted wire pairs. Thus in the embodiment of FIG. 2B, having an embedded clock in each data stream, one 3GIO channel is provided for the interfacing the wireless MAC 216 to the wireless PHY 222. One simplex pair, or twisted pair, is for use in TX signaling and one simplex pair is for use in RX signaling.

As before, the wireless MAC 216 can include a software defined wireless MAC 216 which allows a particular piece of firmware to be used as a wireless MAC 216 from product to product. As before, the wireless MAC 216 accommodates connection to radio PHYs 222 from multiple communication standards. And, as discussed before, a pre-established, standardized, or defined protocol interfaces the wireless MAC 216 to the wireless PHY 222 over the 3GIO channel, e.g. 233-1 and 233-2 such that the wireless MAC 216 does not have to depend on a particular wireless PHY's 222 communication standard and the wireless PHY 222 can be vendor independent.

However, the embodiments of FIG. 2B can be contrasted from the embodiments of FIG. 2A in that the embodiments of FIG. 2B use two twisted wire pairs, whereas the embodiments of FIG. 2A use three twisted wire pairs, with one simplex pair providing a differential clock signal to the wireless MAC.

In the embodiments of FIG. 2B, the embedded clock in the each data stream of the 3GIO lines, e.g. 233-1 and 233-2, is configurable to operate at a 500 MHz or lower clock cycle. Thus, even though the wireless module 222 is operating typically in the Giga Hertz band, the MAC 216 modified clock cycle of the embedded clock in each data stream of the 3GIO lines, e.g. 233-1 and 233-2, provides for a manageable and good timing closure between the MAC-PHY, 216-222, interface. As one of ordinary skill in the art will further appreciate, the use of 3GIO lines, 233-1 and 233-2, can separate the wireless MAC 216 and the wireless PHY 222 by length of a meter or greater. Once again, the various embodiments contained herein permit added flexibility for positioning the wireless PHY 222 in consideration of RF performance.

Figure 3:
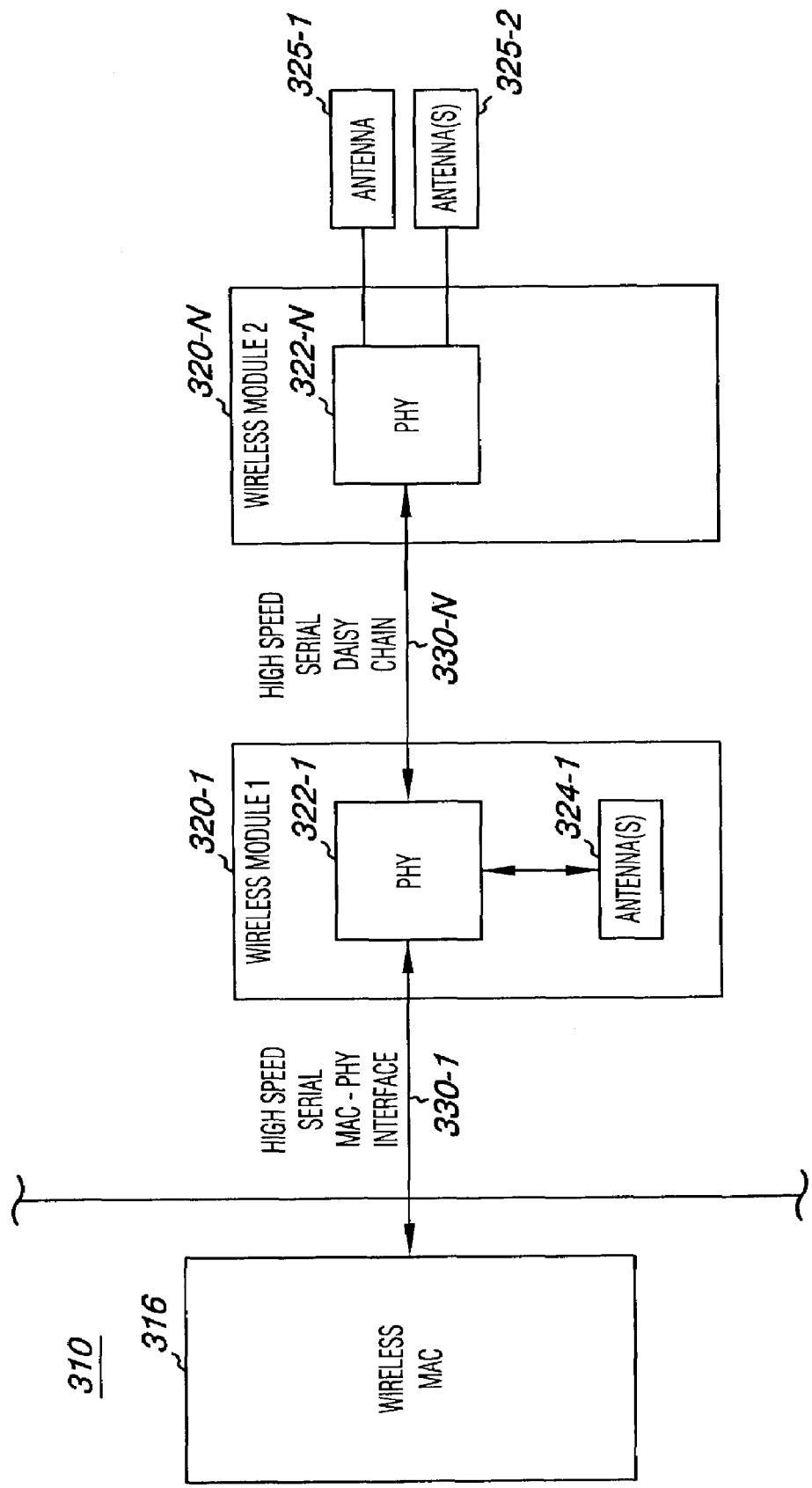
FIG. 3 illustrates an embodiment for a MAC-PHY interface to one or more PHY devices in a wireless system.

FIG. 3 illustrates an embodiment for a MAC-PHY interface to one or more PHY devices in wireless system. FIG. 3 is intended to illustrate that various embodiments of the present invention can accommodate a wireless device or system in which one or more wireless PHY devices can be operably coupled to a wireless MAC in a daisy chain manner, as the same will be known and understood by one of ordinary skill in the art upon reading this disclosure. Thus, in the embodiment of FIG. 3 an electronic device includes a host system 310 and the host 310 includes a wireless MAC 316 on it's motherboard, internal electronics board, or other printed circuit board. FIG. 3 illustrates that the wireless MAC 316 can interface with one or more wireless modules, 320-1, . . . , 320-N, each having at least one PHY device, e.g. 322-1, . . . , 322-N.

In the embodiment of FIG. 3, a high speed serial MAC-PHY interface 330-1 provides connectivity between the wireless MAC 316 and PHY device 322-1. And, another high speed serial daisy chain, 330-N, provides connectivity between PHY device 322-1 and PHY device 322-N. As one of ordinary skill in the art will appreciate upon reading this disclosure, the wireless MAC 316 can interface to the one or more PHY devices, 322-1, . . . , 322-N, using one or more differential signal lines, 330-1 and 330-N, as discussed and described in detail above.

In the embodiment of FIG. 3, one wireless module 320-1 is illustrated including antenna(s) 324-1 within the module 320-1, similar to wireless module 120 in FIG. 1A. And, the embodiment of FIG. 3 illustrates another wireless module 320-N wherein the antennas 325-1 and 325-2 are coupled to the PHY device 322-N of module 320-N, but are external or separate from the wireless module 320-N itself, similar to wireless module 120 in FIG. 1B. The same is provided by way of illustration and not by way of limitation.

Figure 4A:
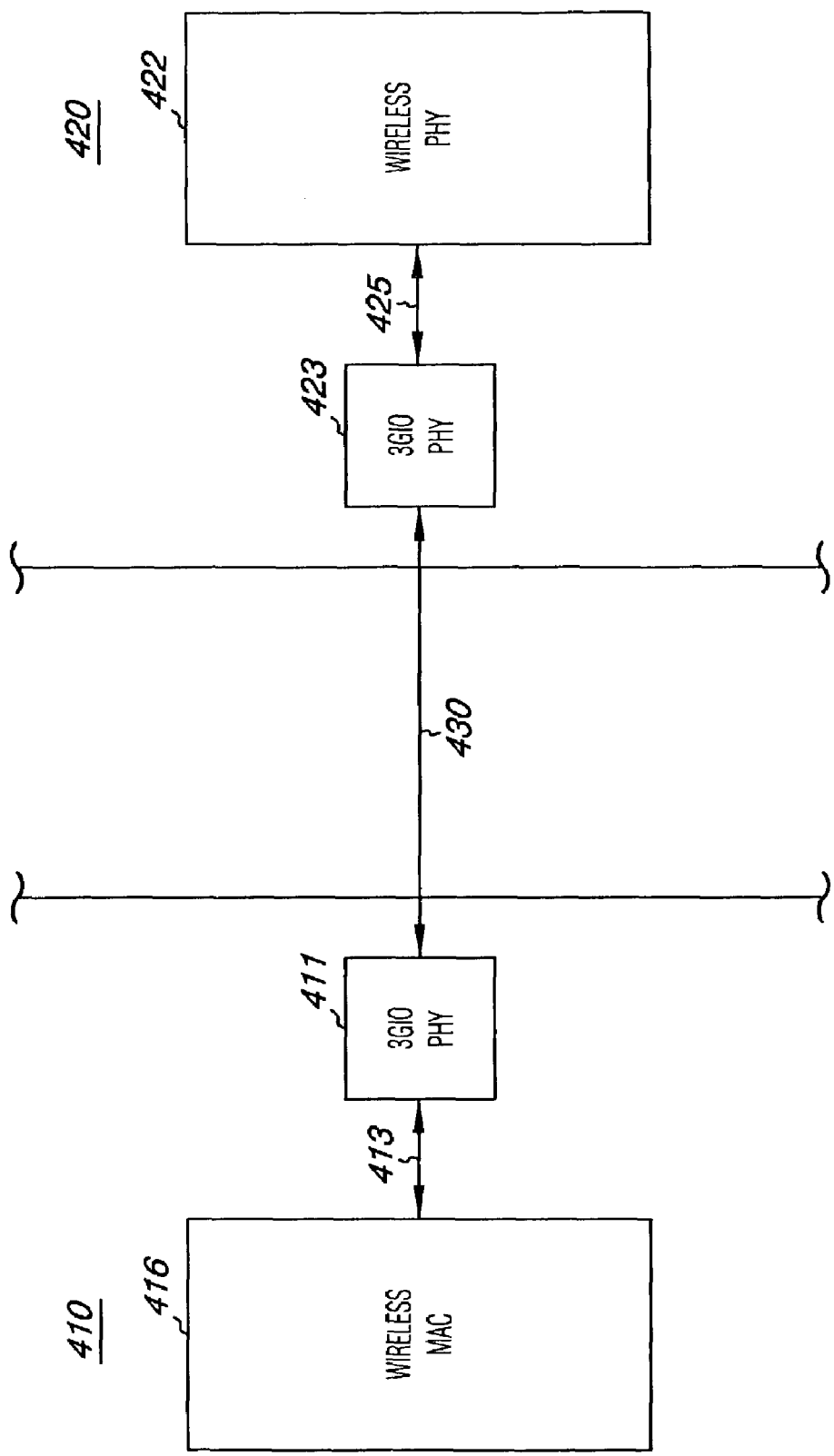
FIG. 4A illustrates an embodiment for a MAC-PHY interface having a third generation input/output (3GIO) module located on both sides of the interface.

FIG. 4A illustrates an embodiment for a MAC-PHY interface utilizing third generation input/output (3GIO) lines as described in some of the above embodiment discussion. In various embodiments, 3GIO lines can be dedicated to a MAC-PHY interface. In the embodiment of FIG. 4A, a host system 410 is shown including a wireless MAC 416 which is interfaced to a wireless PHY device 422 within a wireless module 420 via one or more differential signal lines 430. In the embodiment of FIG. 4A, the one or more differential signal lines 430 are third generation input/output (3GIO) lines 430. In embodiments utilizing 3GIO lines to interface a wireless MAC 416 to a wireless module 420, each side of the interface includes a 3GIO physical layer (PHY) block, e.g. 411 and 423. In the embodiment of FIG. 4A, the wireless MAC 416 is coupled via 413 to 3GIO PHY block 411 on the host 410 side. And, the wireless PHY 422 is coupled via 425 to 3GIO PHY block 423 on the wireless module 420 side.

As one of ordinary skill in the art will appreciate upon reading this disclosure, embodiments of the invention can include a software defined wireless MAC 416 (firmware that can be used from product to product) that accommodates connection to radio PHYs 422 from multiple communication standards using a pre-established, standardized, or defined MAC-PHY protocol over a 3GIO channel, afford manageable, and good timing closure between the MAC-PHY interface, and permit separating a wireless MAC from a wireless PHY by a length of a meter or greater to permit added flexibility for positioning the wireless PHY in consideration of RF performance.

FIG. 4B illustrates an embodiment for a MAC-PHY interface utilizing 3GIO lines. In various embodiments, 3GIO lines can be interchangeably used either as standard 3GIO channels or as a MAC-PHY interface depending on configuration. In this manner, pre-existing 3GIO lines can be used to implement the various embodiments of the present invention and to provide an efficient use of hardware with the 3GIO lines serving a dual functionality. In the embodiment of FIG. 4B, a host system 410 is shown including a wireless MAC 416 which is interfaced to a wireless PHY device 422 within a wireless module 420 via one or more differential signal lines 430. As in the embodiment above, FIG. 4A, each side of the interface includes a 3GIO physical layer (PHY) block, e.g. 411 and 423. In the embodiment of FIG. 4B, the wireless MAC 416 is selectably coupled via 413 to 3GIO PHY block 411 on the host 410 side. And, the wireless PHY 422 is coupled via 425 to 3GIO PHY block 423 on the wireless module 420 side.

In the embodiment illustrated in FIG. 4B, the host 410 further includes a full 3GIO stack 421. That is, the 3GIO interface with the host 410 includes an OSI seven layer stack including a respective MAC-PHY. In various embodiments, the wireless MAC 416 has its own standard interface to 3GIO stack 421.

In the embodiment of FIG. 4B, a system configuration bit from component 415 can be provided by host 410 to selectably configure the 3GIO lines to be used as either as standard 3GIO channels in a first mode or as a MAC-PHY interface in a second mode. That is, in various embodiments, a configuration bit 415 can dedicate a number of 3GIO lines for use as a MAC-PHY interface, 416-422 via 413 to achieve the interfacing between the wireless MAC 416 in the host 410 and the wireless PHY 422 in the wireless module 420. Likewise, a configuration bit 415 can connectively configure 3GIO PHY block 411 to an entire 3GIO stack 421 via 413 to be used as standard 3GIO channels.

In PC implementations, two 3GIO channels (one channel including two simplex pairs, or two twisted wire pairs) can be used as standard channels or as MAC-PHY interface channels depending upon configuration. Thus, the various embodiments allow pins on a chipset to be used as a general purpose 3GIO channel if the MAC is not used.

Figure 5A:
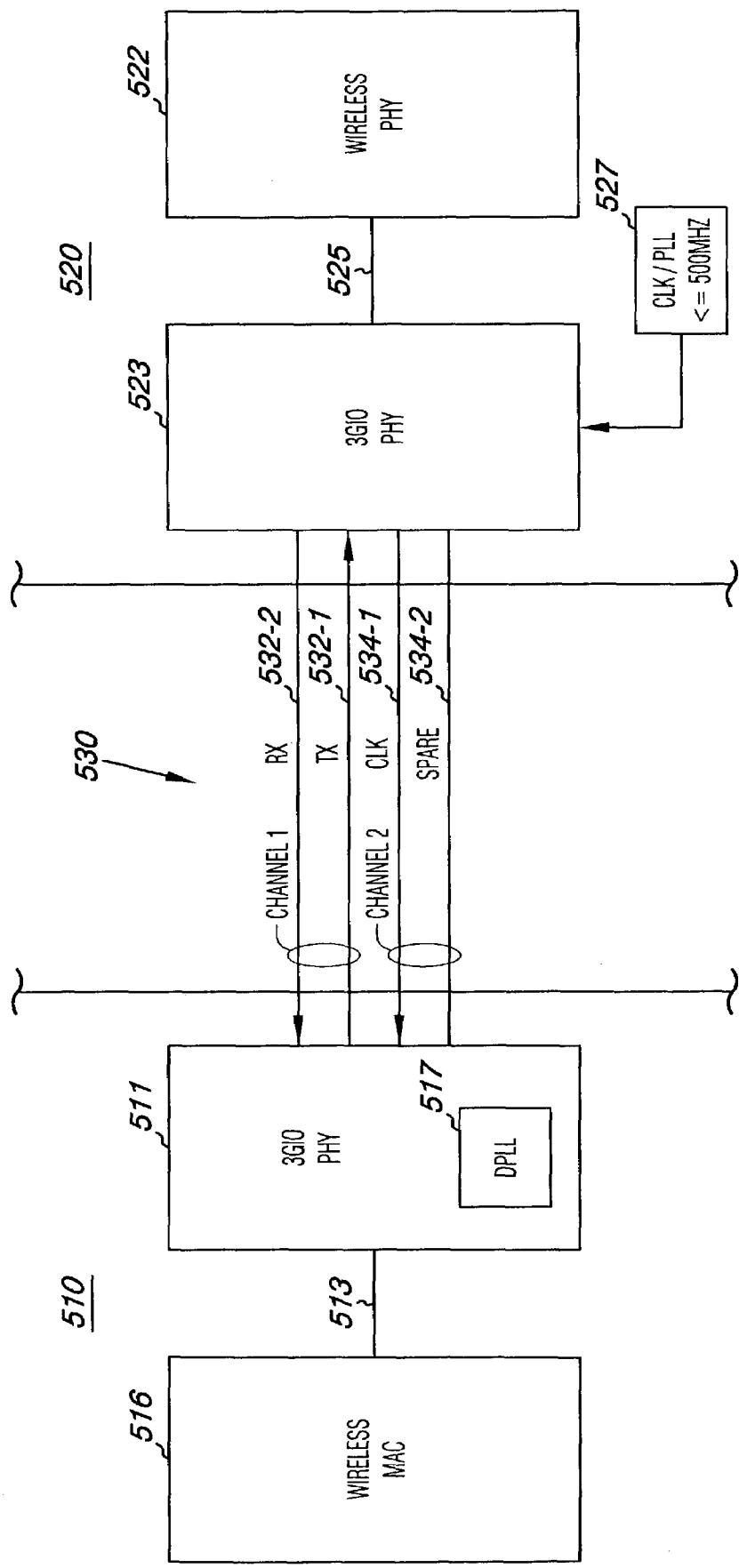
FIG. 5A illustrates another embodiment for a MAC-PHY interface having a third generation input/output (3GIO) module located on both sides of the interface.

FIG. 5A illustrates additional detail of another embodiment for a MAC-PHY interface utilizing 3GIO lines. In the embodiment of FIG. 5A, a host system 510 is shown including a wireless MAC 516 which is interfaced to a wireless PHY device 522 within a wireless module 520 via one or more differential signal lines 530. In the embodiment of FIG. 5A, the one or more differential signal lines 530 are third generation input/output (3GIO) lines 530. In the embodiment of FIG. 5A, two 3GIO channels (one channel including two simplex pairs, or two twisted wire pairs) are illustrated.

In FIG. 5A, a first one of the two 3GIO channels (CHANNEL 1) includes one simplex pair 532-1 which can be used for transmitting signals (TX) MAC-to-PHY in the MAC-PHY interface, 516-522, and includes one simplex pair 532-2 which can be used for receiving signals (RX) PHY-to-MAC in the MAC-PHY interface, 516-522. A second one of the two 3GIO channels (CHANNEL 2) includes one simplex pair 534-1 which can be used for providing clock signals (CLK) from the PHY-to-MAC in the MAC-PHY interface, 516-522, and includes one simplex pair 534-2 which can be used as a spare.

Again, in embodiments utilizing 3GIO lines to interface a wireless MAC 516 to a wireless module 520, each side of the interface includes a 3GIO physical layer (PHY) block, e.g. 511 and 523. In the embodiment of FIG. 5A, the wireless MAC 516 is coupled via 513 to 3GIO PHY block 511 on the host 510 side. And, the wireless PHY 522 is coupled via 525 to 3GIO PHY block 523 on the wireless module 520 side.

In the embodiment of FIG. 5A, a digital phase locked loop (DPLL) module 517 is provided with 3GIO PHY block 511. In the embodiment of FIG. 5A, a reference clock source 527 is provided which can provide a reference clock signal to 3GIO PHY block 523. In various embodiments, such as shown in the embodiment of FIG. 5A, the reference clock source 527 includes a reference clock source 527 which is configured to provide a 500 MHz or lower clock cycle to 3GIO PHY block 523 for transmission, PHY-to-MAC, on simplex pair 534-1. As one of ordinary skill in the art will appreciate upon reading this disclosure, the DPLL module 517 is operable for resolving the reference clock signal from the wireless module clock source 527.

Figure 5B:
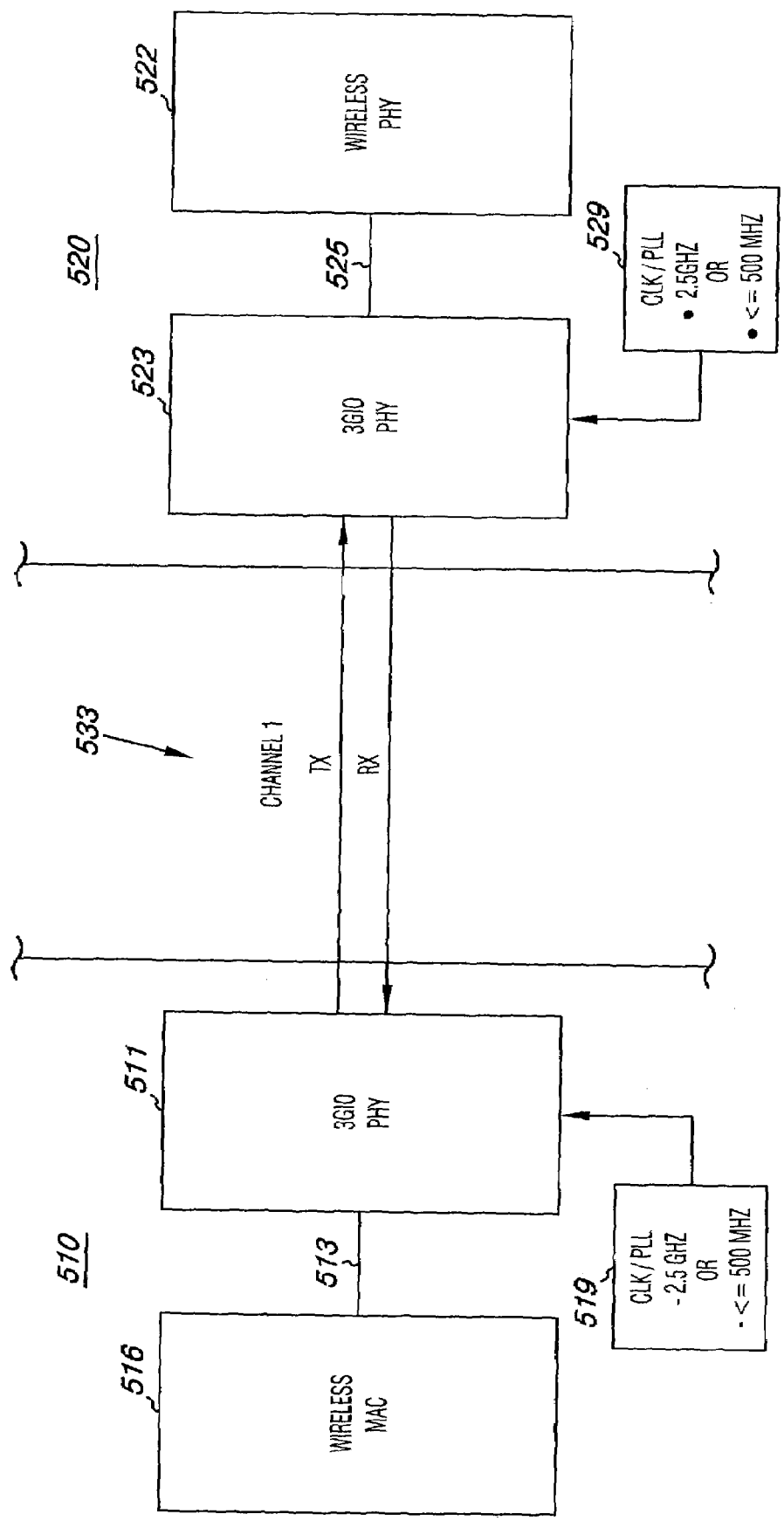
FIG. 5B illustrates another embodiment for a MAC-PHY interface having a third generation input/output (3GIO) module located on both sides of the interface.

FIG. 5B illustrates another embodiment for a MAC-PHY interface according to various embodiments of the invention. In the embodiment of FIG. 5B, a host system 510 is shown including a wireless MAC 516 which is interfaced to a wireless PHY device 522 within a wireless module 520 via a 3GIO channel 533 (one channel including two simplex pairs, or two twisted wire pairs).

In the embodiment of FIG. 5B, the 3GIO channel 533 (CHANNEL 1) includes one simplex pair (TX) which can be used for transmitting signals, MAC-to-PHY, in the MAC-PHY interface, 516-522 and includes one simplex pair (RX) which can be used for receiving signals, PHY-to-MAC, in the MAC-PHY interface, 516-522. The 3GIO channel uses an embedded clock in each data stream. Current 3GIO channels include embedded clocks operating at 2.5 GHz and are expected to increase to 10 GHz.

Again, in embodiments utilizing 3GIO lines to interface a wireless MAC 516 to a wireless module 520, each side of the interface includes a 3GIO physical layer (PHY) block, e.g. 511 and 523. In the embodiment of FIG. 5B, the wireless MAC 516 is coupled via 513 to 3GIO PHY block 511 on the host 510 side. And, the wireless PHY 522 is coupled via 525 to 3GIO PHY block 523 on the wireless module 520 side.

In the embodiment of FIG. 5B, a clock source 519 is provided in the host 510 and another clock source 529 is provided in the wireless module 520. In the embodiment of FIG. 5B, clock source 519 and 529 are configurable to operate at more than one clock cycle such that the embedded clock provided in each data stream on simplex pair (TX) and (RX) can be varied. In various embodiments, by way of example and not by way of limitation, clock source 519 can be selectably configured by host 510 to provide a 500 MHz or lower embedded clock in each data stream on simplex pair (TX) when CHANNEL 1 is in a first mode, operating as a MAC-PHY interface channel, and can be selectably configured by host 510 to provide a 2.5 GHz embedded clock in each data stream on simplex pair (TX) when CHANNEL 1 is in a second mode, operating as a standard 3GIO channel. Similarly, by way of example and not by way of limitation, clock source 529 can be selectably configured by wireless module 520 to provide a 500 MHz or lower embedded clock in each data stream on simplex pair (RX) when CHANNEL 1 is in a first mode operating as a MAC-PHY interface channel and can be selectably configured by wireless module 520 to provide a 2.5 GHz embedded clock in each data stream on simplex pair (RX) when CHANNEL 1 is in a second mode operating as a standard 3GIO channel. One of ordinary skill in the art will understand that the terms first and second do not imply a sequential order, but rather, imply that there are at least two modes possible in this embodiment.

In addition to the advantages described above, the flexibility of architectural design in the various embodiments can obviate the need for a PLL in a MAC chip. For architectural designs which do not use an existing 3GIO interface (FIG. 4B), but design a dedicated MAC-PHY interface by just using the 3GIO physical layer (FIG. 5A), the design becomes all digital.

Figure 6:
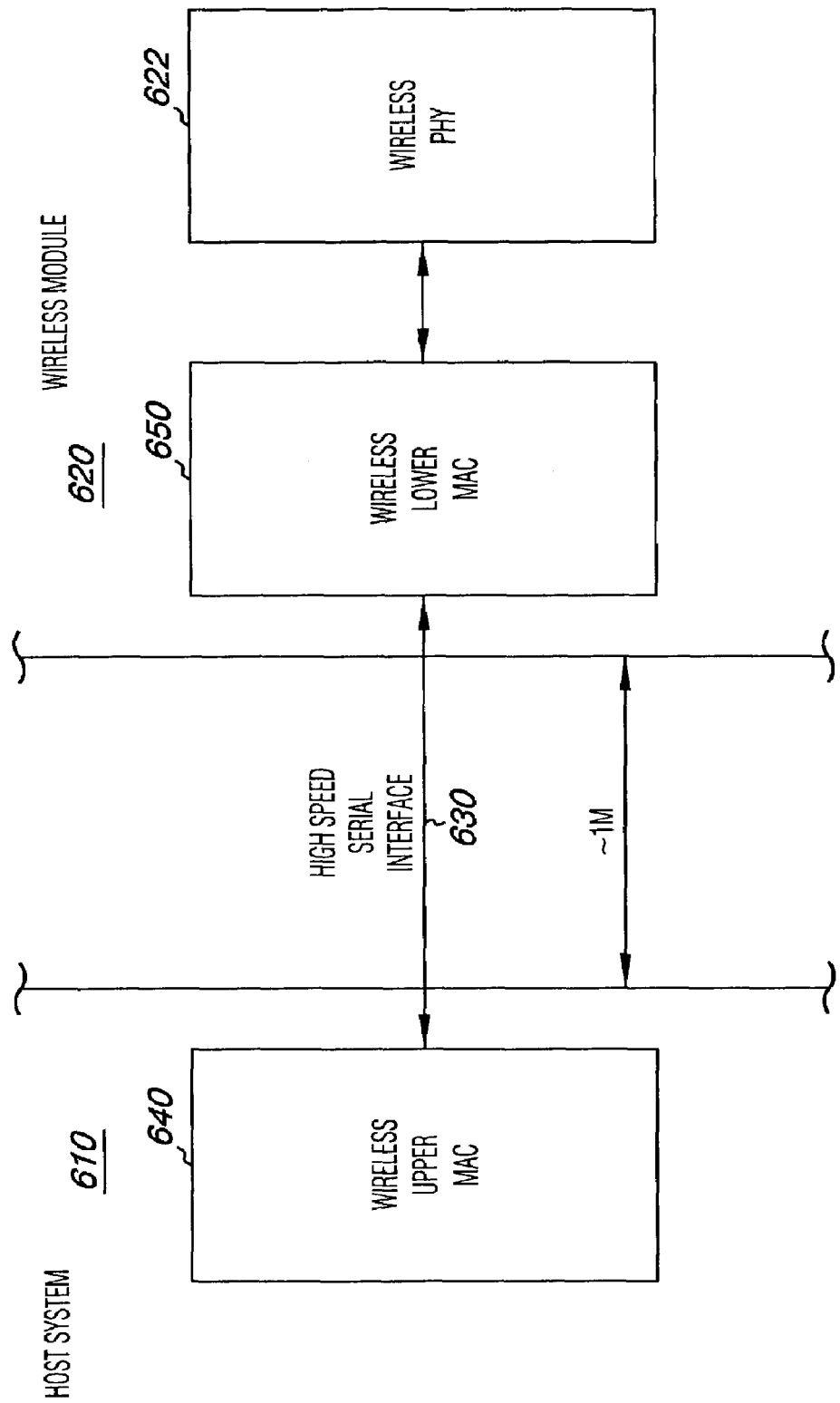
FIG. 6 illustrates another embodiment for a MAC-PHY interface.

FIG. 6 illustrates another embodiment for a MAC-PHY interface. In the embodiment of FIG. 6, a host system 610 includes an upper MAC 640. As before, the upper MAC 640 can be software defined. A high speed serial interface 630, such as those described in the various embodiments herein, couples the host 610 to a wireless module 620. In the embodiment of FIG. 6, wireless module 620 includes a lower MAC 650 coupled to a wireless PHY 622.

As one of ordinary skill in the art will appreciate upon reading this disclosure, the software defined upper MAC and lower MAC embodiments, 640 and 650 respectively, of FIG. 6 can provide added "upward integration" in wireless architectures. In various embodiments, the software defined upper MAC and lower MAC, 640 and 650, can facilitate the implementation of firmware that can be used from product to product, can accommodate connection to radio PHYs 622 from multiple communication standards using a pre-established, standardized, or defined MAC-PHY protocol over a 3GIO channel, can afford manageable, and good timing closure between the MAC-PHY interface, and can permit separating a wireless MAC from a wireless PHY by a length of a meter or greater to permit added flexibility for positioning the wireless PHY in consideration of RF performance.

Figure 7A:
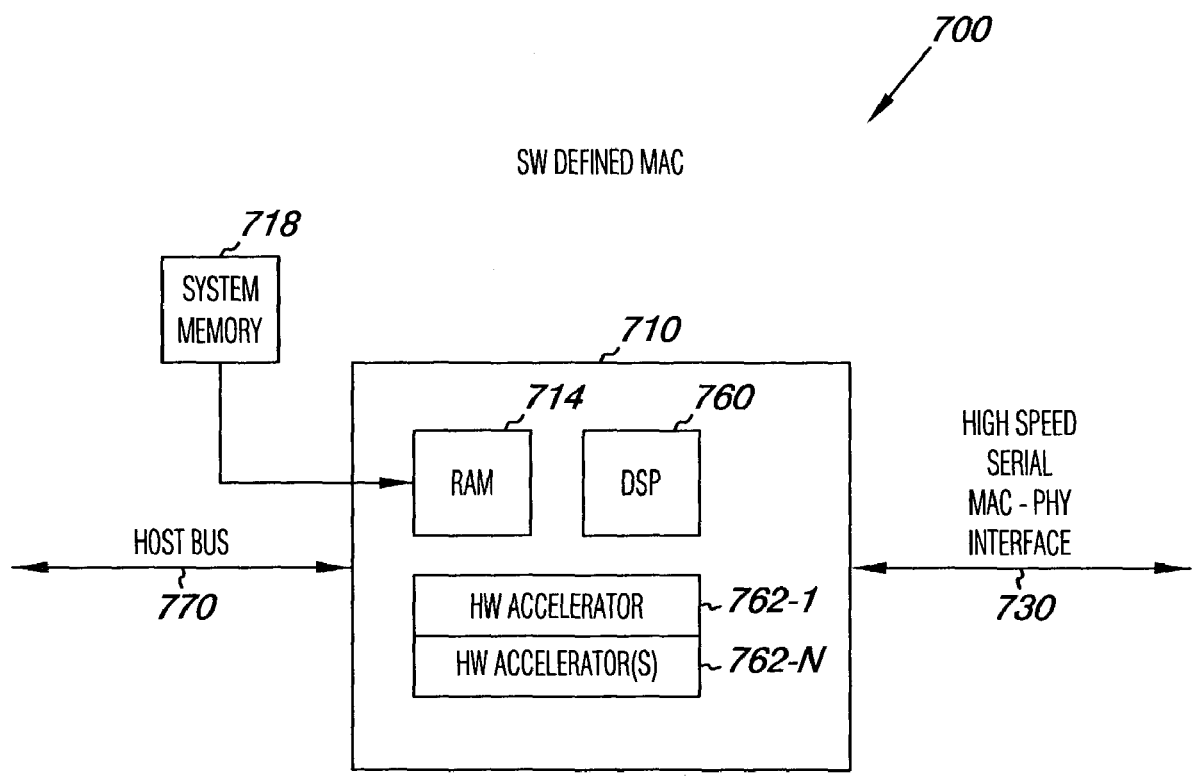
FIG. 7A illustrates an embodiment for a software defined MAC.

FIG. 7A illustrates an embodiment for a software defined MAC. The embodiment of FIG. 7A illustrates a software definable wireless MAC 710. In the embodiment of FIG. 7A, the software definable wireless MAC 710 includes memory, such as random access memory (RAM) 714. The invention, however, is not limited to any one particular type of memory and one of ordinary skill in the art will appreciate upon reading this disclosure that other memory, such as flash memory, DDRAM, among others can be used. As shown in the embodiment of FIG. 7A, the software defined wireless MAC 710 includes a digital signal processor (DSP) 760 operable to process signals according to computer readable instructions from RAM 714, among other sources.

The embodiment of FIG. 7A further illustrates a system memory 718. Software is downloadable from system memory 718 to memory on the software defined wireless MAC 710, e.g. RAM 714, to achieve the embodiments described herein. Various embodiments can include hardware accelerator modules, such as hardware accelerator modules 762-1, . . . , 762-N shown on the software defined wireless MAC 710 in the embodiment of FIG. 7, in order to assist in encryption and other functions as the same will be known and understood by one of ordinary skill in the art. In the embodiment of FIG. 7A, a host bus 770 is illustrated as provided to the software defined wireless MAC 710. The software defined wireless MAC 710 is coupled to a high speed MAC-PHY interface 730 as the same has been described in the various embodiments herein.

Figure 7B:
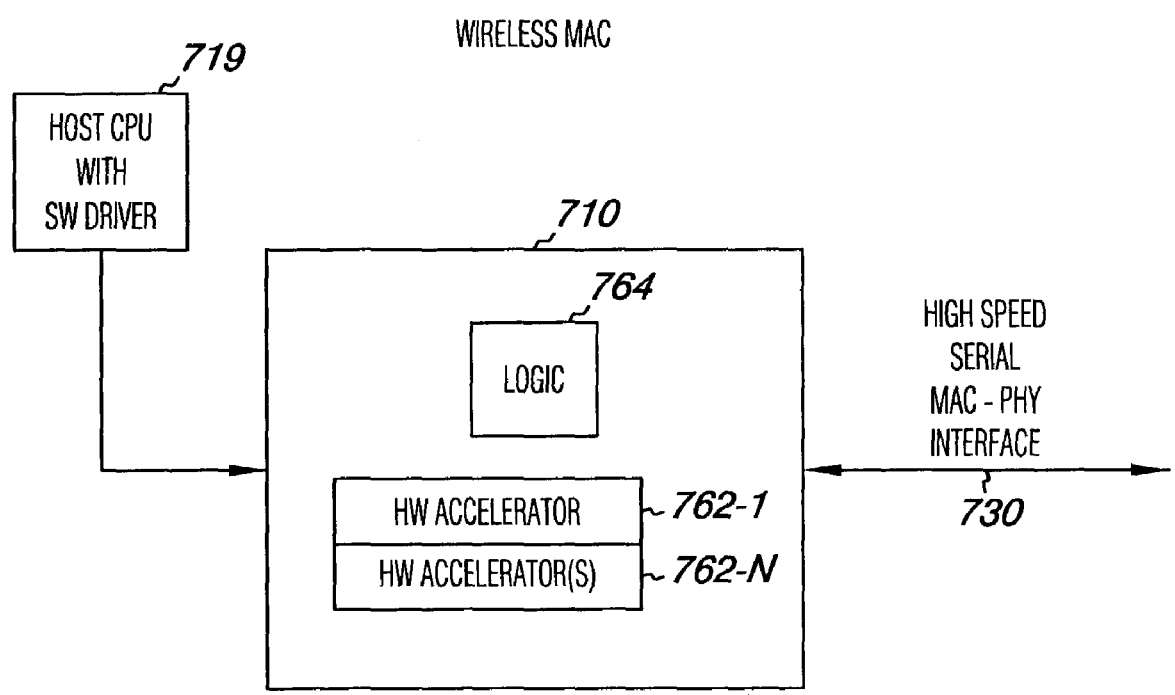
FIG. 7B illustrates another embodiment for a software defined MAC.

FIG. 7B illustrates another embodiment for a wireless MAC 710 which can be software defined. The embodiment of FIG. 7B accommodates a streamlined hardware configuration for the wireless MAC 710. In this embodiment, digital signal processing can be performed by a host CPU 719 in connection with a software driver. As one of ordinary skill in the art will appreciate, this embodiment can alleviate the type and amount of logic 764 located on the wireless MAC by distributing or sharing the processing load with the host CPU 719. Logic 764 in the embodiment of FIG. 7B can include glue logic and registers as the same will be understood by one of ordinary skill in the art. As one of ordinary skill in the art will appreciate upon reading this disclosure, the wireless MAC 710 hardware can be designed to work with various drivers in the host CPU 719 in order to make the MAC 710 compatible with different wireless standards. In such embodiments, the MAC 710 framing functionality can be handled by the driver and host CPU 719.

FIG. 8A illustrates a front perspective view of a laptop computer environment implementing one or more embodiments of the present invention. As one of ordinary skill in the art will appreciate upon reading this disclosure, the laptop computer 800 is but one example of an electronic device on which the various embodiments of the present invention can be implemented. As shown in the front perspective view of FIG. 8A, the laptop computer environment includes a monitor 802 and a keyboard 804. As shown in FIG. 8A, monitors are typically provided on the top flap of the laptop computer 800. An electronics board 806 is provided within the laptop computer 800. As one of ordinary skill in the art will understand upon reading this disclosure, a software defined wireless MAC, as has been described in the various embodiments herein, can reside on the electronics board 806.

FIG. 8B illustrates a rear perspective view of FIG. 8A. The embodiment of FIG. 8B illustrates a wireless PHY device 808, such as a radio, located in the top flap of the laptop computer 800. The embodiment of FIG. 8B further illustrates an antenna 810 located therein. The invention, however, is not limited to the locations and placements depicted in FIGS. 8A and 8B, and one of ordinary skill in the art will appreciate upon reading this disclosure the manner in which the various embodiments of the present invention can be incorporated into a laptop computing environment, among others, to achieve the aspects and/or advantages described herein. One of ordinary skill in the art will appreciate that cable bundles are provided in the top flap of a laptop computer for transmission of data unrelated to the present invention. Those skilled in the art will appreciate that one or more of these pre-existing cables can be utilized with various embodiments of the present invention or one or more additional cables can be added to the cable bundle to utilize various embodiments of the present invention.

FIG. 9 illustrates a perspective view of a printing device environment implementing one or more embodiments of the present invention. As one of ordinary skill in the art will appreciate upon reading this disclosure, the printing device 900 is but one example of an electronic device on which the various embodiments of the present invention can be implemented. As shown in embodiment of FIG. 9, the printing device environment includes an electronics board 906. In various embodiments, the electronics board 906 can be provided deep within the printing device 900. As one of ordinary skill in the art will understand upon reading this disclosure, a software defined wireless MAC, as has been described in the various embodiments herein, can reside on the electronics board 906.

The printing device embodiment of FIG. 9 further illustrates a wireless PHY device 908, such as a radio, positioned in consideration of RF performance. In various embodiments, the PHY device 908 can be positioned near the top of the printing device 900. The embodiment of FIG. 9 further illustrates an antenna 910 positioned in consideration of RF performance. The invention, however, is not limited to the locations and placements depicted in FIG. 9, and one of ordinary skill in the art will appreciate upon reading this disclosure the manner in which the various embodiments of the present invention can be incorporated into a printing device environment 900, among others, to achieve the aspects and/or advantages described herein.

Figure 10:
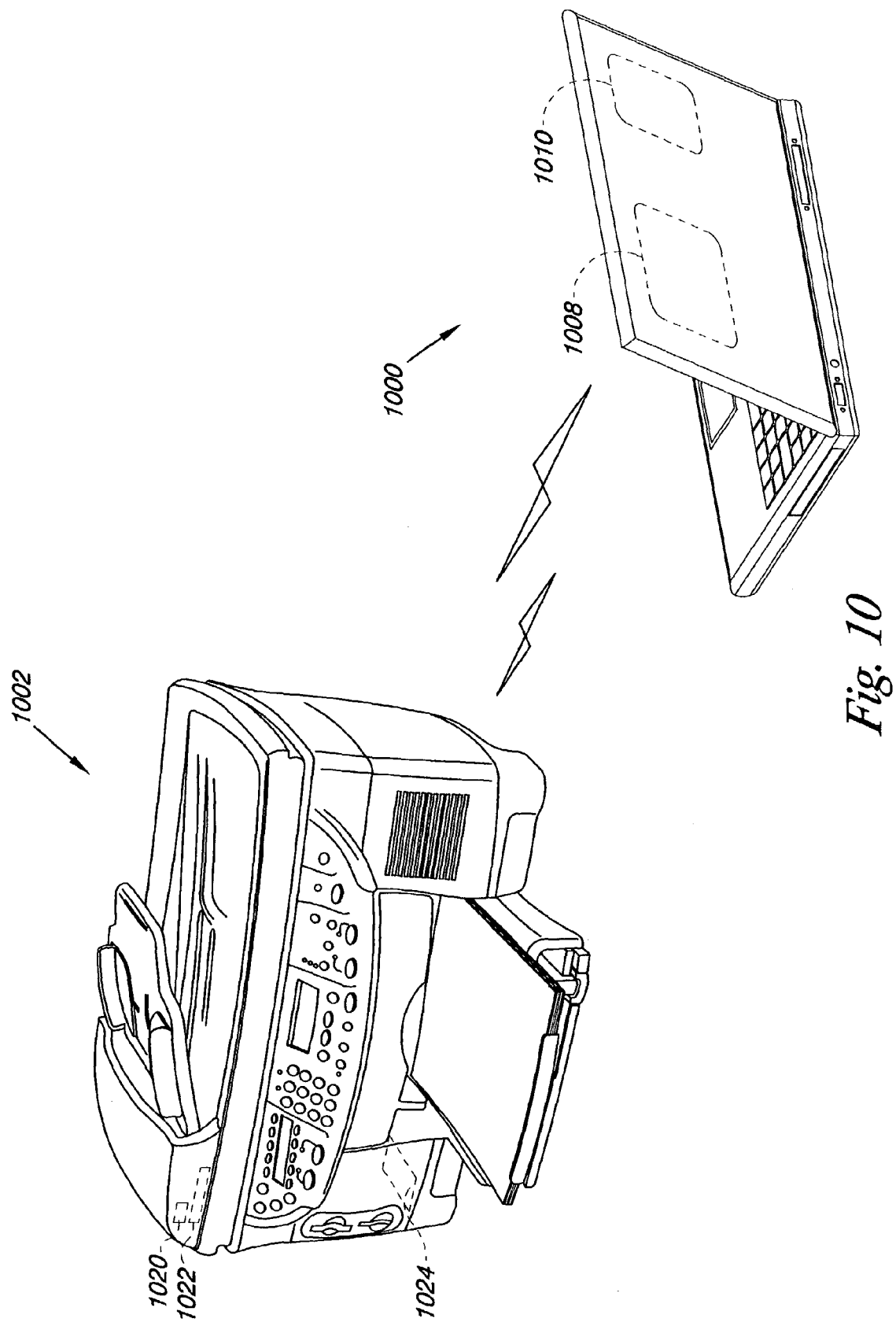
FIG. 10 illustrates a wireless network implementing one or more embodiments of the present invention.

FIG. 10 illustrates a wirelessly networked environment implementing one or more embodiments of the present invention. The wireless network embodiment of FIG. 10, illustrates a perspective view of printing device 1002, such as the printing device embodiment provided in FIG. 9. The embodiment of FIG. 10 further illustrates a rear perspective view of a laptop computer 1000 within the wirelessly networked environment. As described in connection with FIG. 8B, a wireless PHY device 1008, such as a radio, can be located in the top flap of the laptop computer 1000. The embodiment of FIG. 10 further illustrates an antenna 1010 located in the top flap of the laptop computer 1000. As one of ordinary skill in the art will appreciate upon reading this disclosure, the laptop computer 1000 includes an electronics board (not shown) provided within the laptop computer 1000.

In the wireless network embodiment of FIG. 10, the printing device 1002 also includes a wireless PHY device 1022, such as a radio, positioned in consideration of RF performance. In various embodiments, the PHY device 1022 can be positioned near the top of the printing device 1002. The embodiment of FIG. 10 further illustrates an antenna 1020 positioned in consideration of RF performance. The printing device further includes an electronics board 1024. In various embodiments, the electronics board 1024 can be provided deep within the printing device 1002. As one of ordinary skill in the art will understand upon reading this disclosure, a software defined wireless MAC, as has been described in the various embodiments herein, can reside on the electronics boards of both the laptop computer 1000 and the printing device 1002.

One of ordinary skill in the art will appreciate upon reading this disclosure, that data signals can be wirelessly passed between the laptop computer 1000 and the printing device 1002 implementing the various embodiments of the present invention. As one of ordinary skill in the art will appreciate, implementation of the various embodiments of the present invention is not limited to use in the specific devices illustrated in the embodiment of FIG. 10. And, as one of ordinary skill in the art will appreciate upon reading this disclosure the wirelessly networked environment illustrated in the embodiment of FIG. 10 can include a wireless wide area network (WWAN), a wireless local area network (WLAN), and a wireless personal area network (WPAN). The invention is not so limited.

Figure 11:
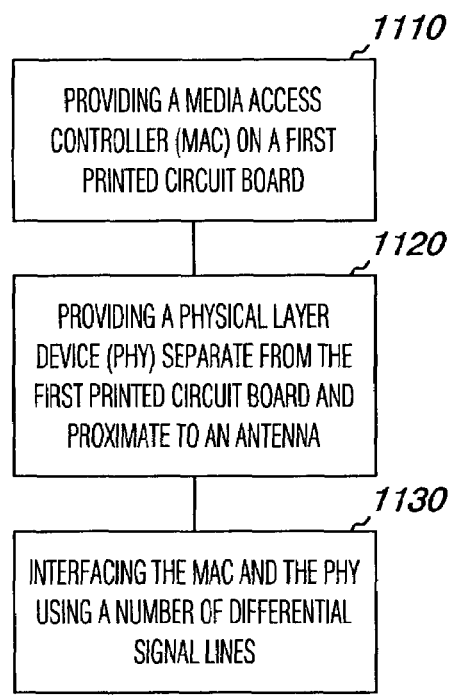
FIG. 11 illustrates a method embodiment for interfacing a MAC and a PHY device.
Figure 12:
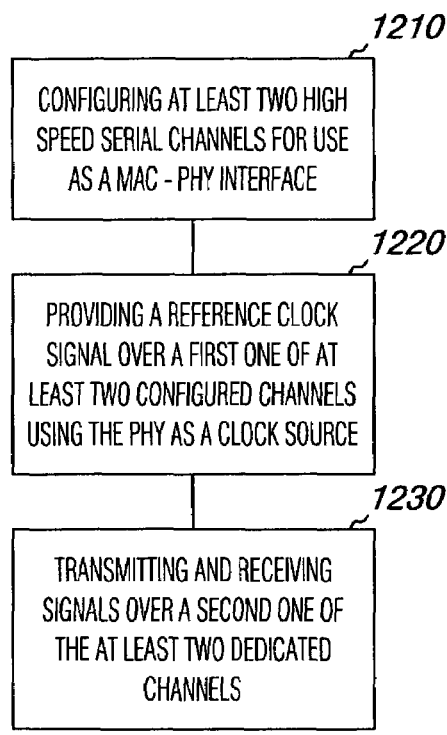
FIG. 12 illustrates another method embodiment for interfacing a MAC and a PHY device.
Figure 13:
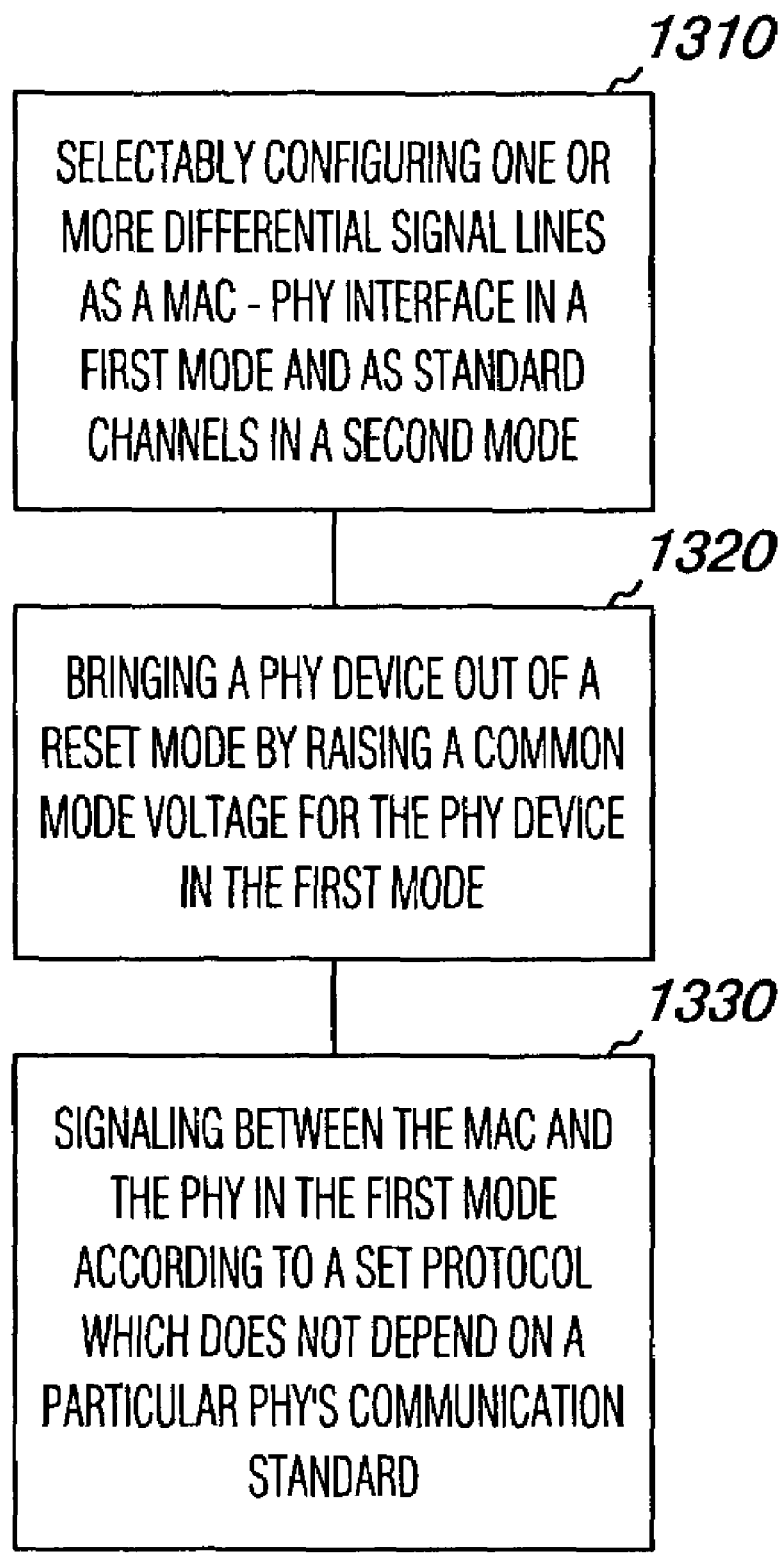
FIG. 13 illustrates another method embodiment for interfacing a MAC and a PHY device.

FIGS. 11-13 are block diagrams illustrating various method embodiments of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language. Unless explicitly stated, the methods described below are not constrained to a particular order or sequence. Additionally, some of the so described methods can occur or be performed at the same point in time.

FIG. 11 illustrates a method embodiment for interfacing a MAC to PHY device. In the embodiment of FIG. 11, the method includes providing a media access controller (MAC) on a first printed circuit board at block 1110. The method further includes providing a physical layer device (PHY) separate from the first printed circuit board and proximate to an antenna at block 1120. At block 1130, the method includes interfacing the MAC and the PHY using a number of differential signal lines.

FIG. 12 illustrates another method embodiment for interfacing a MAC to PHY device. In the embodiment of FIG. 12, the method includes configuring at least two high speed serial channels for use as a MAC-PHY interface at block 1210. At block 1220, the method further includes providing a reference clock signal over a first one of at least two configured channels using the PHY as a clock source. At block 1230, the method further includes transmitting and receiving signals over a second one of the at least two dedicated channels.

FIG. 13 illustrates another method embodiment for interfacing a MAC to PHY device. In the embodiment of FIG. 13, the method includes selectably configuring one or more differential signal lines as a MAC-PHY interface in a first mode and as standard channels in a second mode, as shown in block 1310. At block 1320, the method further includes bringing a PHY device out of a reset mode by raising a common mode voltage for the PHY device in the first mode. At block 1330, the method includes signaling between the MAC and the PHY in the first mode according to a set, pre-established, or standardized protocol which does not depend on a particular PHY's communication standard.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A wireless device interface, comprising:
 a media access controller (MAC) on a printed circuit board (PCB);
 a physical layer (PHY) device; and
 one or more high speed serial input/output channels interfacing the MAC to the PHY device,
 wherein at least one of the high speed serial input/output channels is configured to operate as a standard channel and provide a 2.5 GHz embedded clock in each data stream when in a first mode and operate as a MAC-PHY interface and provide a 500 MHz or lower embedded clock in each data stream when in a second mode.

2. The wireless interface of claim 1, wherein the PHY device is located off of the PCB.

3. The wireless interface of claim 2, wherein the one or more high speed serial input/output channels include one or more high speed serial input/output channels having a length of approximately 1 meter.

4. The wireless interface of claim 1, wherein the PHY device is selected from the group of a WLAN PHY, a WWAN PHY, and a WPAN PHY.

5. The wireless interface of claim 1, wherein the one or more high speed serial input/output channels include at least one third generation input/output (3GIO) channel.

6. A wireless architecture, comprising:
 a media access controller (MAC) on a printed circuit board (PCB);
 one or more physical layer (PHY) devices located off of the PCB; and
 one or more high speed serial input/output channels operable to interface the MAC to the one or more PHY devices,
 wherein the one or more high speed serial input/output channels include at least one high speed serial input/output channel having a data stream with an embedded clock and which is configurable by a host operating system to operate at a 500 Mhz or lower clock cycle, wherein the at least one high speed serial input/output channel is configurable by a host operating system to operate as a standard channel in a first mode and to operate as a MAC-PHY interface in a second mode.

7. The wireless architecture of claim 6, wherein the MAC is software defined to allow connection to radio PHY devices selected from the group of a wireless local area network (WLAN) PHY device, a wireless personal area network (WPAN) PHY device, and a wireless wide area network (WWAN) PHY device.

8. The wireless architecture of claim 6, wherein the MAC is operable to interface with wireless PHY devices having a number of different communication standards.

9. The wireless architecture of claim 6, wherein the one or more high speed serial input/output channels operable to interface the MAC to the one or more PHY devices include at least one high speed serial input/output channel having a length of at least one meter which is operable to interface the MAC to a PHY device located proximate to an antenna.

10. The wireless architecture of claim 6, wherein the one or more high speed serial input/output channels include at least two dedicated third generation input/output (3GIO) channels including;
one simplex pair useable as a clock source from a PHY device;
one simplex pair useable for transmission (TX);
one simplex pair useable for receiving (RX); and
one simplex pair useable for additional enhancements.

11. The wireless architecture of claim 10, wherein the MAC includes a digital phase locked loop (DPLL) component.

12. A wireless system, comprising:
an electronic device, wherein the electronic device includes;
a software defined media access controller (MAC) on a printed circuit board (PCB);
one or more physical layer (PHY) devices located off of the PCB; and
one or more differential signal lines to interface the MAC to the one or more PHY devices,
wherein at least one of the differential signal lines is configured by a host operating system to operate as a standard channel in a first mode and operate as a MAC-PHY interface in a second mode.

13. The system of claim 12, wherein the one or more differential signal lines include third generation high speed serial input/output channels, and wherein the one or more PHY devices includes a number of PHY devices operably coupled to the MAC in a daisy chain manner.

14. The system of claim 12, wherein the one or more differential signal lines include at least three simplex pairs, wherein one simplex pair is used for transmitting, one simplex pair is used for receiving signals, and wherein one simplex pair is operable to provide a clock source from the one or more PHY devices.

15. The system of claim 12, wherein the electronic device includes a printing device.

16. The system of claim 15, wherein the one or more differential signal lines include discrete twisted wire pairs.

17. The system of claim 16, wherein the printing device further includes an antenna positioned near a top portion of the printing device.

18. The system of claim 17, wherein the one or more PHY devices are positioned proximate to the antenna.

19. The system of claim 12, wherein the electronic device includes a laptop computer.

20. The system of claim 19, wherein the one or more differential signal lines include micro-coax cable.

21. The system of claim 20, wherein the micro-coax cable is located within a top flap of the laptop computer.

22. The system of claim 21, wherein the micro-coax cable is contained in a pre-existing micro-coax bundle provided to a monitor in the top flap of the laptop computer.

23. The system of claim 22, wherein the laptop computer further includes an antenna located within the top flap.

24. The system of claim 23, wherein the one or more PHY devices are located within the top flap.

25. The system of claim 12, wherein the MAC includes one or more hardware acceleration modules.

26. A method of interfacing a MAC to one or more physical layer (PHY) devices, comprising;
providing a media access controller (MAC);
providing one or more PHY devices; and
interfacing the MAC and the one or more PHY devices with one or more high speed serial channels, including operating at least one of the high speed serial channels as a standard third generation input/output (3GIO) channel and providing a 2.5 GHz embedded clock in each data stream when in a first mode and operating the at least one of the high speed serial channels as a MAC-PHY interface and providing a 500 MHz or lower embedded clock in each data stream when in a second mode.

27. The method of claim 26, wherein providing a media access controller (MAC) includes providing a MAC on a printed circuit board (PCB).

28. The method of claim 27, wherein providing one or more PHY devices includes providing one or more PHY devices proximate to an antenna.

29. The method of claim 28, wherein providing one or more PHY devices includes providing at least one PHY device located off of the PCB on which the MAC is provided.

30. The method of claim 26, wherein interfacing the MAC and the one or more PHY devices with one or more high speed serial channels includes dedicating at least two high speed serial channels as an interface between the MAC and a PHY device.

31. The method of claim 26, wherein interfacing the MAC and the one or more PHY devices with one or more high speed serial channels includes interfacing using one or more high speed serial channels having a length of at least one meter.

32. A computer readable medium encoded with computer executable instructions for causing a device to perform a method, comprising:
configuring at least two high speed serial channels for use as an interface between a media access controller (MAC) and a physical layer (PHY) device, including configuring by a host operating system at least one of the high speed serial channels to operate as a standard channel in a first mode and operate as a MAC-PHY interface in a second mode;
providing a reference clock signal over a first one of the at least two high speed serial channels; and
transmitting and receiving data signals over a second one of the at least two high speed serial channels.

33. The computer readable medium of claim 32, wherein configuring at least two high speed serial channels for use as an interface between a media access controller (MAC) and a physical layer (PHY) device includes using a configuration bit to dedicate the at least two high speed serial channels.

34. The computer readable medium of claim 32, wherein providing a reference clock signal over a first one of the at least two high speed serial channels includes bringing the PHY device out of a reset mode by raising a common mode voltage for the PHY device.

35. The computer readable medium of claim 32, wherein transmitting and receiving data signals over a second one of the at least two high speed serial channels includes transmitting and receiving data signals according to a pre-established protocol which is independent from a communication standard defined for the PHY device.

36. A wireless architecture, comprising:
- a media access controller (MAC) on a printed circuit board (PCB);
- a physical layer (PHY) device located off of the PCB; and
- means for interfacing the MAC to the PHY device independent of a communication standard defined for the PHY device, including means for selectably configuring by a host operating system at least two high speed serial channels to be used as MAC-PHY interface channels in a first mode of operation and selectably configuring by the host operating system the at least two high speed serial channels to be used as standard channels in a second mode of operation.

37. The wireless architecture of claim 36, wherein the means for interfacing the MAC to the PHY device independent of the communication standard defined for the PHY device includes employing a standardized MAC-PHY interface protocol.

38. The wireless architecture of claim 36, wherein selectably configuring at least two high speed serial channels to be used as MAC-PHY interface channels in a first mode of operation includes configuring at least two third generation input/output (3GIO) channels and using one of the two 3GIO channels as a clock source from the PHY device.

39. The wireless architecture of claim 38, wherein using one of the two 3GIO channels as a clock source from the PHY device includes providing a clock cycle of 500 MHz or less.

* * * * *